Oct. 23, 1945.     B. ANDERSEN ET AL     2,387,227
SHATTERPROOF PLASTICS
Filed March 20, 1942
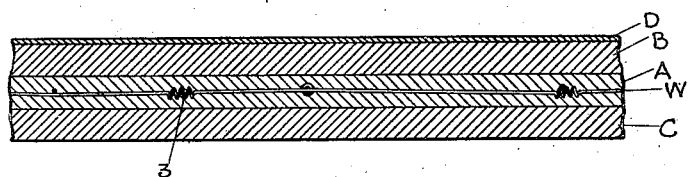
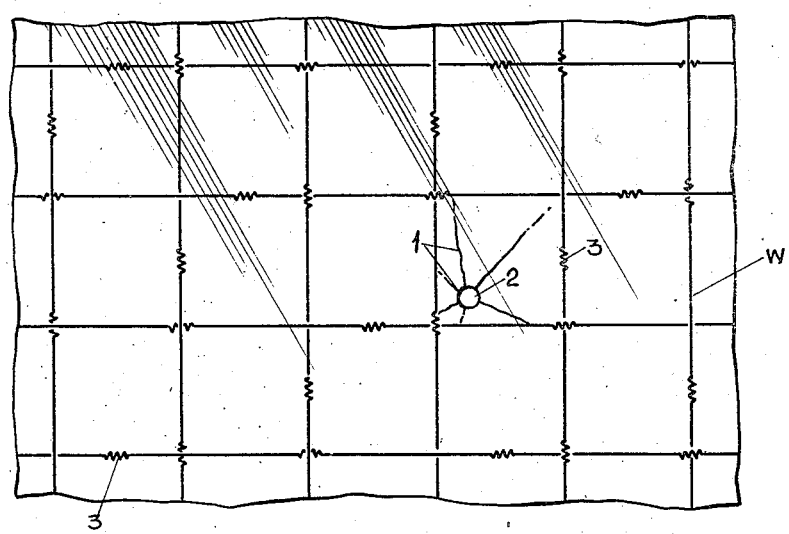
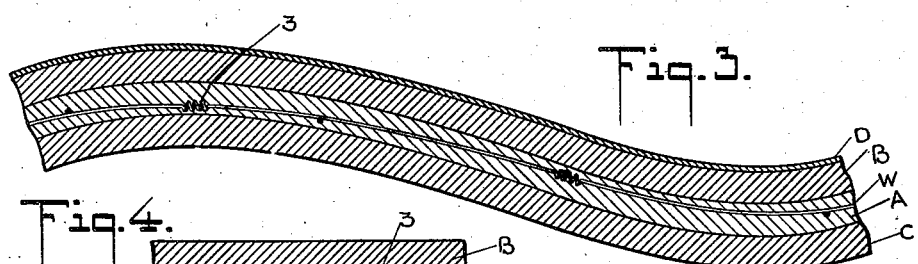
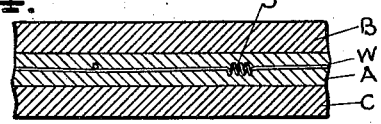
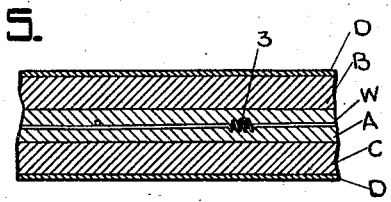
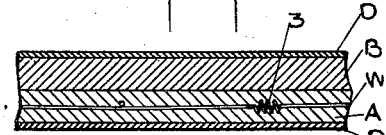
INVENTORS
B. ANDERSEN
E. SCHWEIZER
BY
ATTORNEYS Patented Oct. 23, 1945

2,387,227

UNITED STATES PATENT OFFICE 2,387,227

SHATTERPROOF PLASTIC

Bjorn Andersen, Maplewood, and Ernest Schweizer, East Orange, N. J., assignors to Celanese Corporation of America, a corporation of Delaware Application March 20, 1942, Serial No. 435,490

3 Claims. (Cl. 154—2)

This invention relates to the preparation of shatterproof glass substitutes, and relates more particularly to the preparation of plastic composites which are resistant to the shattering effects of bullet impact even at sub-zero temperatures.

An important object of this invention is the provision of windows and windshields in cockpits, gun turrets and other compartments for aircraft built to fly in the stratosphere where they are subjected to low temperatures.

Another object of this invention is to provide plastic composites having high clarity, good weathering characteristics, and that are shatterproof particularly at low temperatures.

A further object of this invention is to provide a shatterproof plastic composite capable of being hot-formed into three-dimensional shapes for aeroplane nose sections, turrets and similar parts.

Other objects of the invention will appear from the following detailed description and drawing.

In the drawing there are shown several modifications of our invention, the reference characters referring to the same or similar elements in the respective views.

Fig. 1 is a cross-section of one modification of our invention,

Fig. 2 is a plan view, on a reduced scale, of the modification shown in Fig. 1,

Fig. 3 is a cross-sectional view of the modification shown in Fig. 1 showing in detail the position of the shatter controlling wire in a composite molded to a three-dimensional shape, Figs. 4, 5 and 6 are cross-sectional views of other modifications of our invention.

A great need has developed for transparent plastic sheet material suitable for use in war and commercial aircraft as window panes and windshields in cockpits, gun turrets and other compartments. Bombers often operate at an altitude of 35,000 feet, which is well within the stratosphere, where the temperature remains constant at about —70° C. As is well known, the cabins of such aircraft are under suitable pressure. Moreover, such aircraft may be based in the tropics where the interior of the cabins may attain a temperature as high as 140° F. Consequently, materials intended for this use must withstand such temperatures without loss of shape. Furthermore, the materials when used in war aircraft must be shatterproof such that the impact of a bullet would not shatter a pane allowing a quick drop in pressure in cabins which are under pressure. In this respect, it must be remembered that complete resistance to bullet penetration is not sought. What is desired, and is solved by the present invention, is freedom from shattering under the impact of a bullet, restricting the size of the hole and the radiating cracks to an area only slightly larger than the bullet. If a bullet were to penetrate and completely shatter a section of a window, it would be impossible to maintain the desired high pressure in the cabin and the occupants would be in danger. The relatively small holes, such as those made by machine gun bullets in a pane of the plastic composite of the present invention, can easily and quickly be patched by placing cellulosic adhesive tape, or cementing plastic discs over them, without substantial loss of pressure.

In accordance with our invention, we produce a composite plastic having an inter-layer with a metal wire insert "floating" therein, which interlayer is relatively soft at its forming or shaping temperature. In one of the most simple forms the composite plastic material, produced in accordance with this invention, will consist of three layers, an inner soft plastic layer having a wire mesh "floating" therein bounded or laminated on each side to a more rigid, harder and more scratch-resistant outer plastic layer. By the term "floating," as herein used, is meant that at the forming temperature where the composite sheets are drawn or bent around a mold with heat and pressure to three dimensional shapes, the plastic layer containing the wire is sufficiently fluid to allow some movement and deforming of the wire without cutting the layer and to equalize any stress produced by the movement of the wire such that the clarity of the resulting product is not impaired by distortions, displacements, light refractions and strains set up in the plastic. Many modifications may be produced with the above basic principle in mind, as will be clear from a description of the invention with reference to the drawing.

In Figs. 1, 2 and 3 there is shown one modification of our invention comprising a plastic layer A having an open wire mesh W floating therein with harder scratch-resistant layers B and C laminated thereto with an anti-fogging layer D coated on or laminated to the layer B, or, as shown in Fig. 5, to both layers B and C, and, as shown in Fig. 6, to the layers B and A, there being no layer C in this particular modification. The layer A may comprise highly plasticized cellulose derivative sheets, having a base of cellulose acetate, cellulose acetate-propionate, cellulose actate-butyrate, cellulose nitrate or other cellulose ester or cellulose ether, such as ethyl cellulose, benzyl cellulose, etc., some of which are described with reference to laminated glass in Walsh U. S. Patent No. 1,936,044. Any suitable plasticizer may be employed in the preparation of the various cellulose derivative layers, the amount and type depending upon the composition of the layer in the composite. Among the cellulose derivative plasticizers which have been found suitable are dimethoxy ethyl phthalate, dimethyl phthalate, diethyl phthalate, triacetin, dibutyl tartrate, methyl phthalyl ethyl glycollate, para ethyl toluene sulphonamide, etc. Mixtures of these plasticizers and fire retardants, such as triphenyl phosphate, may also be employed. For the inner soft layer, water-soluble plasticizers may be employed, particularly those imparting flexibility at low temperatures such as, for example, isobutylene glycol and polyglycol derivatives, such as tri- or tetraethylene polyglycol esters and ethers. The outer hard layers of the composite are preferably made with water-proof or weather resistant compositions. Where cellulose acetate-butyrate is employed a particularly effective plasticizer is butyl phthalyl butyl glycollate, while the preferred plasticizers for ethyl cellulose are a mixture of ortho and para ethyl toluene sulphonamide, methyl or ethyl phthalyl ethyl glycollate and the chlorinated diphenyls sold under the trade name "Arochlors." However, dibutyl phthalate and tricresyl phosphate are also of value. The central soft layer having the wire floating therein may contain about 70 to 85 or more parts by weight of the plasticizer while the wear-resisting outer layers preferably contain less than 50 parts by weight of a plasticizer, say from 25 to 45 parts by weight.

The layer A may also comprise highly plasticized synthetic resinous compositions such as polymerized vinyl acetate, co-polymers of vinyl acetate and vinyl chloride, polymerized vinylidene chloride, polymerized methyl and/or ethyl acrylate, polymerized methyl methacrylate, polymerized styrol and polyvinyl acetal sheets. These products appear in the market under various trade names, respectively, such as Gelva, Vinylite, Saran, Plexigum, Lucite, Lustron and Butacite. The preferred plasticizers for use with synthetic resins are methyl phthalyl ethyl glycollate and dibutyl phthalate and tricresyl phosphate, although any other suitable plasticizer may be used.

Our invention also contemplates the use of combinations of cellulose derivatives and synthetic resins. Thus, layers B and C may be plasticized cellulose acetate, while the inner layer may be a soft plasticized polyvinyl acetal resin, i. e. Butacite. These heterogeneous layers are united to each other by the use of suitably mutually acting solvents as cementing aids between the various layers.

In layer A is embedded an open wire mesh W. This wire mesh is not intended to substantially strengthen the composite but is provided to limit the shattering effect or cracks 1 that radiate from a bullet hole 2. The wire is preferably of fine gauge, say about 16 gauge, and is woven in a mesh of various shapes, i. e. square, hexagonal, etc., and of such dimension that there is little interference with optical clarity. The wire is preferably a high tensile strength steel, or suitable alloy, etc., and is preferably provided with crimped portions 3. The crimped portions allow a movement of the wire in molding operations without its snapping, that is, it allows the wire as a fabric to be stretched. As shown in Fig. 3, the wire as a fabric moves, relative to layer A, on bending and it no longer need be in the center as shown in Fig. 1. It is this movement of the wire in layer A during the molding that gives rise to the term "floating."

The softer layer A should be sufficiently tough and adhesive to hold the broken fragments of the outer layers together when broken, and should be soft and flowable at an elevated temperature, such at 325° F., or within the range employed in shaping, molding or bending of the completed composite. Such molding temperatures will depend upon the composite layers and will usually be above 200° F., say about 325° F., for cellulose acetate layers. The wire mesh may be embedded in the layer as it is formed by casting or extruding methods or two preformed or "cut" sheets may be laminated together with the wire interposed therebetween. The wire may be precoated with a soft plastic composition. Furthermore, a wire fabric may be placed upon a soft preformed sheet and a layer of plastic flowed, brushed or sprayed over the wire fabric. The thickness of the layer A will depend upon the gauge of wire employed, the radius of the bend or bends and, as this layer is usually the pliable, adhesive layer which prevents the flying of splinters, its inherent strength. Obviously, for stratosphere plane gun turrets, the total thickness is kept as thin as possible within the safety range of other desired properties such that the optical clarity of same is at its optimum. In this respect it may be stated that the layers shown in the drawing are not to be considered limitations.

The layer B may be of the same chemical material as the layer A and have the same general properties, or it may be a layer of harder and/or tougher material. The thickness of layer B may vary from, say, .050" to .300", or more, depending on the particular application. Furthermore, the layer B may be in itself built up of two or more layers each of increasing hardness and/or toughness or hard and tough layers interposed in any desired manner. Thus, the outer surface of layer B may be a layer such as D in the drawing, which layer may comprise a cast film of 0.01" or less in thickness and relatively hard in character better to withstand abrasions and also to overcome objectionable "knife lines" that often reappear in "cut sheets" during the molding operation. The layer C may be of the same composition and thickness as layer B or of an entirely different plastic material and/or properties. Layers B and C need not be of the same thickness. As shown in Fig. 6, it is not necessary to have both a layer B and a layer C but either may be dispensed with, or both may be combined into one layer on one side of the layer A. The composite may be built up of two or more layers, say, 3, 4, 5, 6 and 7 layers.

In some instances it is desirable to provide an anti-fogging layer D to one (Fig. 1) or both (Fig. 5) sides of the composite. This may be a thin film of cellulose acetate treated with a saponifying agent either before or after lamination to the composite or it may be a coating of any material suitable for such purpose. D may also represent a layer of thin "cast" film as previously mentioned and used for the purposes set forth.

As shown in Fig. 2 the impact of a bullet piercing the composite at 2 creates a shattering effect portrayed by the lines 1 radiating from the point of impact. The composite nature of the finished sheet prevents flying pieces in much the same manner as laminated glass and the embedded wire fabric tends to limit the run or length of the cracks to a single or a few wire meshes. The floating of the wire in the layer A, at the molding temperature, permits bending and molding without producing stresses or displacements that interfere with clarity.

If desired, one or more layers of the composite may contain dyes and/or ultra-violet light absorbers. In certain instances it may be made opaque or translucent, as distinguished from optically clear, by pigments and fillers.

The following examples illustrate the invention, but are not to be considered as limiting it in any way:

Example I

A sheet of soft plastic material having a thickness of 0.10" of the following composition:

| | Parts by weight |
|---|---|
| Cellulose acetate | 100 |
| Dimethoxy ethyl phthalate | 80 | and having an open mesh wire fabric embedded therein is laminated between two harder sheets 0.05" in thickness having the following composition:

| | Parts by weight |
|---|---|
| Cellulose acetate | 100 |
| Dimethoxy ethyl phthalate | 30 |

Example II

A sheet of plastic material having a thickness of 0.15" of the following composition:

| | Parts by weight |
|---|---|
| Ethyl cellulose | 100 |
| Methyl phthalyl ethyl glycollate | 25 |
| Suitable stabilizer | Q.S. | and having an open mesh wire fabric embedded therein is laminated between two sheets 0.08" and 0.02", respectively, in thickness having the following composition:

| | Parts by weight |
|---|---|
| Cellulose acetate | 100 |
| Dimethyl phthalate | 30 |

Example III

A sheet of plastic material having a thickness of 0.06" of the following composition:

| | Parts by weight |
|---|---|
| Polymerized vinyl acetate | 100 |
| Methyl phthalyl ethyl glycollate | 75 | and having an open mesh wire fabric embedded therein is laminated between two sheets 0.10" and 0.20", respectively, in thickness having the following composition:

| | Parts by weight |
|---|---|
| Polymerized vinyl acetate | 100 |
| Methyl phthalyl ethyl glycollate | 25 |

Example IV

A sheet of plastic material comprising a soft plasticized polyvinyl acetal resin (Butacite) of a thickness of 0.06" and having an open mesh wire fabric embedded therein is laminated to a sheet 0.10" in thickness having the following composition:

| | Parts by weight |
|---|---|
| Cellulose acetate | 100 |
| Dimethyl phthalate | 30 |

Example V

A sheet of plastic material comprising a soft plasticized polyvinyl acetal resin (Butacite) of a thickness of 0.06" and having an open mesh wire fabric embedded therein is laminated between two Lucite (polymerized methyl methacrylate resin) sheets each having a thickness of 0.10".

Example VI

A sheet of plastic material comprising a soft plasticized polyvinyl acetal resin (Butacite) of a thickness of 0.06" and having an open mesh wire fabric embedded therein is laminated between two polystyrol sheets each having a thickness of 0.10".

The composite formed in accordance with the foregoing examples may be shaped and exposed to temperatures as high as 140° F. without loss of shape. These composites all show high resistance to shattering on bullet impact, the bullet passing through the same without shattering or breaking the composite and with substantially no cracking of the layer on the exit side, even at temperatures in the vicinity of $-70°$ C. which are experienced in the stratosphere. Where any cracking does take place cracks extend to the wire mesh without going beyond the same.

The hardness of the layers of plastic materials employed in accordance with this invention may be determined and reported in several ways. The indentation hardness of plastics is generally measured by the Brinell and Rockwell methods which are well known in the plastic industry. In these two methods a hardened steel ball is pressed into a smooth surface of the material being tested. In the Brinell method the spherical area of the resulting indentation is measured by calculation from this value and the applied load. In the Rockwell system the depth of the indentation is measured by means of an arbitrary scale, which scale differs for each type of material tested. The Rockwell scale for plastics is designated by the letter "M," see Government Printing Office Publication L—P—406 of December 9, 1942 bearing the title "Federal Standard Stock Catalog" wherein in Section IV (Part 5) is given methods of testing organic plastics. The hardness may also be reported in terms of Vicker's numbers and Shore's sclerosccope numbers, particularly where the sheet is too soft to measure under conditions of the Brinell and Rockwell tests. The Shore's sclerosccope number is the rebound, measured on an arbitrary scale of 140, of a hammer with a diamond striking point falling freely from a height of approximately ¾" (Model D instrument). The Vicker's test is made with a 5 kilogram load applied on a diamond pyramid for 7 seconds.

Sheets of the following hardness have been found suitable in forming the composites of the instant invention, although it is to be understood that sheets of other hardnesses may be employed: Cellulose acetate soft sheets having a Vicker's number slightly higher than 3; cellulose acetate hard sheets having a Brinell hardness (2.5 mm. ball, 10 kg. load) of 6–15, or a Rockwell hardness of M25 to M55; Butacite sheets having a Vicker's number of about 3 and a Shore sclerosccope number of about 45; Lucite sheets having a Brinell hardness (2.5 mm. ball, 25 kg. load) of 18–20, a Rockwell hardness of M85–M105, a Shore sclerosccope number of 73 and a Vicker's number of 18.4; and polystyrol sheets having Brinell hardness (2.5 mm. ball, 25 kg. load) of 20–30, a Rockwell hardness of M55 to M90, a Shore scleroscope number of 65 and a Vicker's number of 20.

It is to be understood that the foregoing detailed description is merely given by way of illustration and that many variations may be made therein without departing from the spirit of our invention.

Having described our invention, what we desire to secure by Letters Patent is:

1. Process for the preparation of shaped plastic composite material having high resistance to shattering from bullet impact, which comprises molding into a three-dimensional shape a composite material comprising a layer of relatively soft plastic material, having embedded therein an open mesh wire fabric the wires of which have crimps along the length thereof, and a layer of harder plastic material at a temperature which causes said relatively soft plastic material to soften so as to permit the wire fabric to float during the molding operation, whereby the molding into a three-dimensional shape is effected without snapping the wires and without producing stresses in said composite material.

2. Process for the preparation of shaped plastic composite material having high resistance to shattering from bullet impact, which comprises molding into a three-dimensional shape a composite material comprising a layer of relatively soft plasticized cellulose acetate material, having embedded therein an open mesh wire fabric the wires of which have crimps along the length thereof, and a layer of harder plasticized cellulose acetate material at a temperature which causes said relatively soft plasticized cellulose acetate material to soften so as to permit the wire fabric to float during the molding operation, whereby the molding into a three-dimensional shape is effected without snapping the wires and without producing stresses in said composite material.

3. Process for the preparation of shaped plastic composite material having high resistance to shattering from bullet impact, which comprises molding into a three-dimensional shape a composite material comprising a layer of relatively soft synthetic resin material, having embedded therein an open mesh wire fabric the wires of which have crimps along the length thereof, and a layer of harder synthetic resin material at a temperature which causes said relatively soft synthetic resin material to soften so as to permit the wire fabric to float during the molding operation, whereby the molding into a three-dimensional shape is effected without snapping the wires and without producing stresses in said composite material.

BJORN ANDERSEN.
ERNEST SCHWEIZER.